(12) United States Patent
Dalonzo et al.

(10) Patent No.: US 10,878,605 B2
(45) Date of Patent: Dec. 29, 2020

(54) SYSTEMS AND METHODS FOR AUGMENTING CONTENT

(71) Applicant: Facebook, Inc., Menlo Park, CA (US)

(72) Inventors: Christian Xavier Dalonzo, San Francisco, CA (US); Puneet Sethi, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/858,864

(22) Filed: Dec. 29, 2017

(65) Prior Publication Data

US 2019/0206103 A1 Jul. 4, 2019

(51) Int. Cl.
*G06T 11/60* (2006.01)
*G06T 11/00* (2006.01)
*G06F 3/0488* (2013.01)
*H04L 29/08* (2006.01)

(52) U.S. Cl.
CPC .......... *G06T 11/60* (2013.01); *G06F 3/04883* (2013.01); *G06T 11/001* (2013.01); *H04L 67/02* (2013.01); *H04L 67/025* (2013.01); *H04L 67/306* (2013.01); *G06T 2207/10024* (2013.01); *G06T 2207/30204* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,352,864 | B2* | 1/2013 | Kaplan | G06T 13/80 345/594 |
| 9,230,355 | B1* | 1/2016 | Ahuja | G06T 11/60 |
| 2007/0229526 | A1* | 10/2007 | Hsu | G06F 9/451 345/581 |
| 2015/0379608 | A1* | 12/2015 | Dorner | G06Q 50/01 705/26.7 |
| 2017/0287172 | A1* | 10/2017 | Sykes | G06F 3/04845 |

* cited by examiner

*Primary Examiner* — Ryan M Gray
(74) *Attorney, Agent, or Firm* — Sheppard Mullin Richter & Hampton LLP

(57) ABSTRACT

Systems, methods, and non-transitory computer readable media can provide a plurality of colored inks for a marker to modify a content item displayed on a display screen of a computing system. A determination can be made that a user has selected a colored ink from the plurality of colored inks, wherein the plurality of colored inks includes a multi-colored ink. One or more lines can be drawn on the display screen based on a user input and the selected colored ink.

20 Claims, 8 Drawing Sheets

500

Provide a plurality of colored inks for a marker to modify a content item displayed on a display screen of a computing system
502

Determine that a user has selected a colored ink from the plurality of colored inks, wherein the plurality of colored inks includes a multi-colored ink
504

Draw one or more lines on the display screen based on a user input and the selected colored ink
506

FIGURE 5

SYSTEMS AND METHODS FOR AUGMENTING CONTENT

FIELD OF THE INVENTION

The present technology relates to the field of content provisioning. More particularly, the present technology relates to techniques for content augmentation in a social networking system.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, audios, articles, and links, via the social networking system.

SUMMARY

Various embodiments of the present disclosure can include systems, methods, and non-transitory computer readable media configured to provide a plurality of colored inks for a marker to modify a content item displayed on a display screen of a computing system. A determination can be made that a user has selected a colored ink from the plurality of colored inks, wherein the plurality of colored inks includes a multi-colored ink. One or more lines can be drawn on the display screen based on a user input and the selected colored ink.

In an embodiment, the multi-colored ink is defined by a color palette, the color palette comprising a plurality of colors.

In an embodiment, the color palette defines an order for the plurality of colors.

In an embodiment, the user input defines a continuous path, and the multi-colored ink transitions between the plurality of colors based on a length of the continuous path.

In an embodiment, the drawing the one or more lines on the display screen comprises drawing a plurality of colored circles based on the user input, the plurality of colored circles defining the one or more lines.

In an embodiment, the drawing the plurality of colored circles comprises superimposing the plurality of colored circles based on the continuous path of the user input.

In an embodiment, the superimposing the plurality of colored circles comprises superimposing the plurality of colored circles in a fixed color sequence based on the color palette.

In an embodiment, the color palette comprises the colors red, orange, yellow, green, blue, indigo, and violet.

In an embodiment, an option can be provided for a selection of a thickness for the marker.

In an embodiment, the drawing the one or more lines on the display screen comprises drawing a plurality of colored circles based on the user input, and the selection of the thickness for the marker defines a diameter of the plurality of colored circles.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method, according to an embodiment of the present disclosure.

Figure 1:
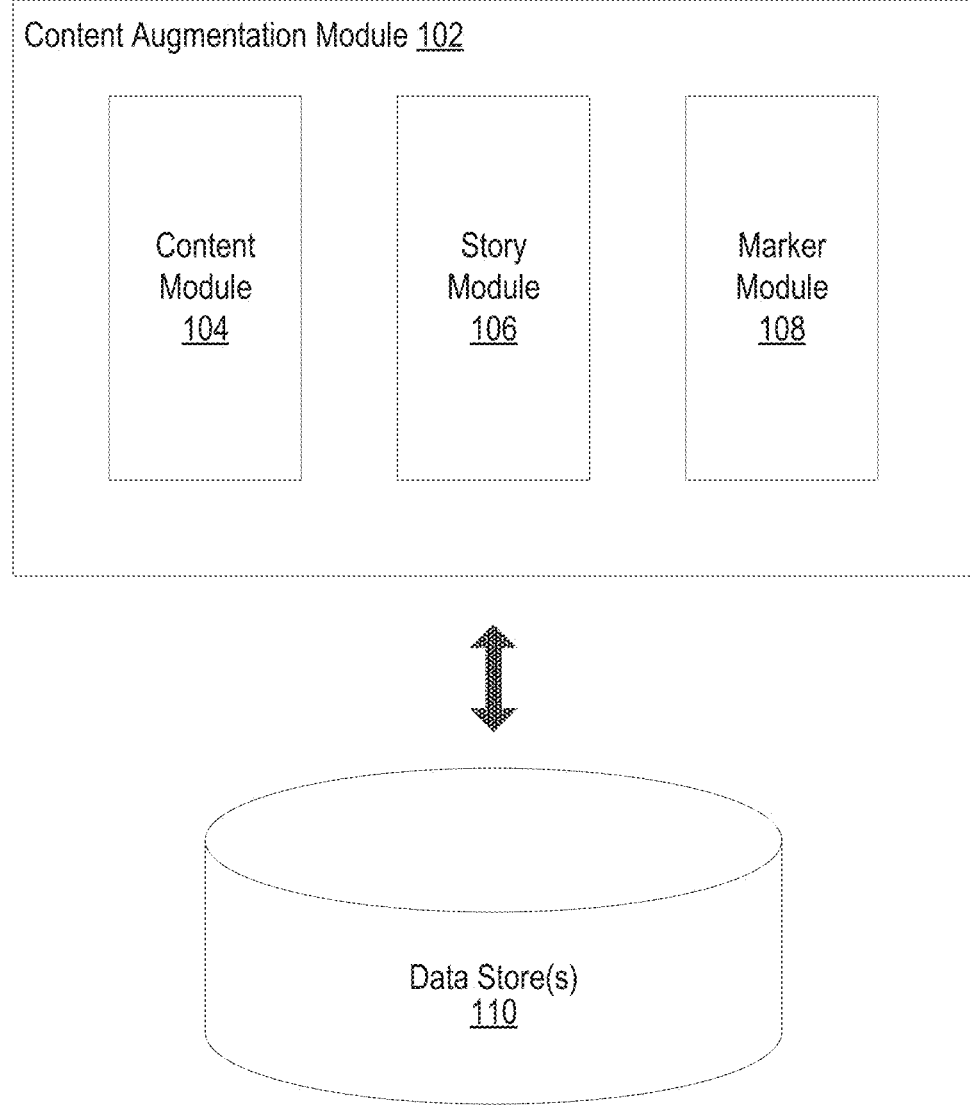
FIG. 1 illustrates an example system including an example content augmentation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches to Augment Content with Multi-Colored Marker

People use computing devices (or systems) for a wide variety of purposes. Computing devices can provide different kinds of functionality. Users can utilize their computing devices to produce information, access information, and share information. In some cases, users can utilize computing devices to interact or engage with a social networking system (e.g., a social networking service, a social network, etc.). A social networking system may provide resources through which users can publish content items. In one example, a content item can be published through a profile page of a user. As another example, a content item can be published through content feeds for users to access. In some embodiments, a user can publish content items as part of a story (or story feed).

A social networking system may also provide resources through which a user may create and share content. For example, under conventional approaches, a user can create a content item that includes drawings or figures drawn by the user. Such drawings or figures can convey a general mood or some other expression, for example. The created content item can be posted (or shared) through a social networking system. In general, tools for generating and sharing content can be limiting for users, especially in a social networking context. For example, users of the social networking system may want to express themselves in more colorful ways than are possible using the tools and features provided to them. Furthermore, if users of a social networking system are provided with tools for generating content that they feel are deficient or uninteresting, users may be discouraged from generating and sharing content on the social networking system. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users can access a multi-colored marker (e.g., a pen, a paint brush) to draw figures or objects on content items. The multi-colored marker can comprise various combinations of colors or series of colors. As a user draws using the multi-colored marker, the multi-colored marker can transition from one color to another. Once the multi-colored marker has transitioned to a last color in the combination of colors or the series of colors, colors can repeat. For example, a multi-colored marker can include the colors red, white, and blue. As a user draws using this multi-colored marker, the multi-colored marker can transition from drawing in red, to drawing in white, to drawing in blue, and back to drawing in red, and so forth. In some embodiments, a multi-colored marker can replicate colors of a rainbow (e.g., a rainbow marker). For example, as a user draws using the rainbow marker, the rainbow marker can gradually change its output color from red, to orange, to yellow, to green, to blue, to indigo, and to violet. A content item including figures or objects drawn with a multi-colored marker can be shared through a social networking system. More details relating to the disclosed technology are provided below.

FIG. 1 illustrates an example system 100 including an example content augmentation module 102, according to an embodiment of the present disclosure. As shown in the example of FIG. 1, the example content augmentation module 102 can include a content module 104, a story module 106, and a marker module 108. In some instances, the example system 100 can include at least one data store 110. The components (e.g., modules, elements, etc.) shown in this figure and all figures herein are exemplary only, and other implementation may include additional, fewer, integrated, or different components. Some components may not be shown so as not to obscure relevant details.

In some embodiments, the content augmentation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content augmentation module 102 or at least a portion thereof can be implemented using one or more computing devices or systems that include one or more servers, such as network servers or cloud servers. In some instances, the content augmentation module 102 can, in part or in whole, be implemented within or configured to operate in conjunction with a social networking system (or service), such as a social networking system 630 of FIG. 6. In some instances, the content augmentation module 102 can be, in part or in whole, implemented within or configured to operate in conjunction or be integrated with a client computing device, such as a user device 610 of FIG. 6. For example, the content augmentation module 102 can be implemented as or within a dedicated application (e.g., app), a program, or an applet running on a user computing device or client computing system. The application incorporating or implementing instructions for performing some, or all, functionality of the content augmentation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In some embodiments, the content augmentation module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g. the social networking system 630 of FIG. 6). The information associated with the social networking system can include data about users, social connection, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the content augmentation module 102. For example, the data store 110 can store information corresponding to colored markers that can be used to augment content items. Again, it is contemplated that there can be many variations or other possibilities.

The content module 104 can be configured to provide users with access to content (e.g., content items) that is available through a social networking system. In some instances, this content can include content items that are posted in content feeds (e.g., story feeds) accessible through the social networking system. For example, the content module 104 can provide a first user with access to content items through an interface that is provided by a software application (e.g., a social networking application) running on a computing device of the first user. The first user can also interact with the interface to post content items to the social networking system. Such content items may include text, images, audio, and videos, for example. For example, the first user can submit a post to be published through the social networking system. In some embodiments, the post can include, or reference, one or more content items.

In various embodiments, other users of the social networking system can access content items posted by the first user. In one example, the other users can access the content items by searching for the first user, for example, by user name through an interface provided by a software application (e.g., a social networking application, browser, etc.)

running on their respective computing devices. In some instances, some users may want to see content items posted by the first user in their respective content feed. To cause content items posted by the first user to be included in their respective content feed, a user can select an option through the interface to subscribe to, or "follow", the first user. As a result, some or all content items that are posted by the first user can automatically be included in the respective content feed of the user. If the user decides that they no longer want to see content from the first user in their respective content feed, the user can select an option through the interface to "unfollow" the first user.

The story module 106 can provide an option that allows users to post their content as stories. In such embodiments, each user has a corresponding story feed in which the user can post content (i.e., stories). When a user's story feed is accessed by another user, the story module 106 can provide content posted in the story feed to the other user for viewing. In general, content posted in a user's story feed may be accessible by any user of the social networking system. In some embodiments, content posted in a user's story feed may only be accessible to followers of the user. In some embodiments, user stories expire after a pre-defined time interval (e.g., every 24 hours). In such embodiments, content posted as stories in a story feed is treated as ephemeral content that is made inaccessible once the pre-defined time interval has elapsed. In contrast, content posted in a user's content feed can be treated as non-ephemeral content that remains accessible for an indefinite period of time. In some embodiments, captured or previously captured images can be used as content for stories.

In some instances, users may want to use one or more multi-colored markers to draw figures or objects on content items to be posted in a social networking system. To permit such creativity, in various embodiments, the marker module 108 can be configured to provide users with access to a multi-colored marker. For example, the multi-colored marker may be selected through an interface provided by a software application (e.g., a social networking application, a browser, etc.) running on a computing device of a user. In this example, the user can interact with the interface to select the multi-colored marker to draw on one or more content items. In various embodiments, the multi-colored marker can output an ink pattern that exhibits a pattern of any selected colors. In some embodiments, the ink pattern can gradually change its color from red, to orange, to yellow, to green, to blue, to indigo, and to violet (e.g., the colors of a rainbow). In some embodiments, the ink pattern can gradually change its color from red, to white, and to blue (e.g., the colors of the U.S. flag). Many variations are contemplated. More details regarding the multi-colored marker module will be provided below with reference to FIG. 2.

Figure 2:
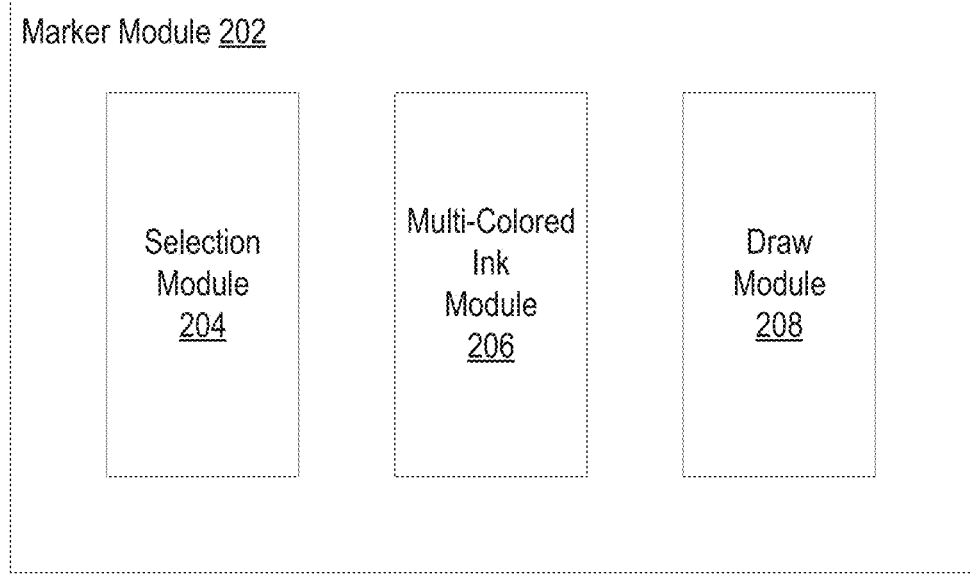
FIG. 2 illustrates a marker module, according to an embodiment of the present disclosure.

FIG. 2 illustrates a marker module 202, according to an embodiment of the present disclosure. In some embodiments, the marker module 108 of FIG. 1 can be implemented as the marker module 202. As shown in the example of FIG. 2, the marker module 202 can include a selection module 204, a multi-colored ink module 206, and a draw module 208.

In some embodiments, the selection module 204 can be configured to provide colored inks, including one or more multi-colored inks, to users of a social networking system. The colored inks can be used to specify one or more colors to be output by a marker that is used to draw on one or more content items. In some embodiments, the selection module 204 can provide one or more panes (or interface portions or segments) of an interface through which the colored inks and the one or more multi-colored inks are accessible through a software application (e.g., a social networking application, browser, etc.) running on a computing device, as illustrated in the example of FIG. 4B. For example, in some embodiments, the selection module 204 can provide a first pane on the interface through which the colored inks and the one or more multi-colored inks are provided. In some embodiments, the selection module 204 can provide additional panes on the interface through which more colored inks are provided. Any number of panes are possible. In some embodiments, a multi-colored ink can be selected to be used by a user to draw objects onto content items. In certain embodiments, a multi-colored ink may have a pre-set combination of colors, i.e., a pre-set color palette. For example, a multi-colored ink, such as a rainbow ink, can be selected to draw on a content item using ink pattern that changes, for example, from red, to orange, to yellow, to green, to blue, to indigo, and to violet. In certain embodiments, a user may be provided with the ability to select a plurality of colors to be used in a multi-colored ink. In other words, a user may be provided with the ability to select a set of colors to be used in a color palette for a multi-colored marker. In some embodiments, a thickness of markers can be adjusted. For example, the selection module 204 may provide an option for users to select a particular thickness or width for the markers.

In various embodiments, the multi-colored ink module 206 can be configured to generate a multi-colored ink as a user performs various gestures to draw with a multi-colored marker on a content item. As mentioned, in some embodiments, the multi-colored ink output by a multi-colored marker can generate an ink pattern of any color combination. In some embodiments, the multi-colored ink can reflect colors of a rainbow. For example, a rainbow ink can gradually change its color from red, to orange, to yellow, to green, to blue, to indigo, and to violet. In some embodiments, In various embodiments, a user can specify the output characteristics of a multi-colored ink by picking a combination of colors to define a color palette for a multi-colored marker. More details regarding the multi-colored ink module 206 will be discussed below with reference to FIG. 3.

In some embodiments, the draw module 208 can be configured to draw lines, figures, and/or objects responsive to a user touch on a display screen of a computing device. For example, a user operating the computing device may drag a finger across a content item being displayed on the display screen. In this example, the draw module 208 can draw lines on the content item and the display screen based on the path of the user's finger as it drags across the display screen. It should be understood that lines can include straight lines, curved lines, or any other type of lines. In some embodiments, the lines can be drawn by placing circles (or ink dots) onto the content item at each location on the display screen on which a touch is detected. For example, a user, upon a selection of a colored ink, can touch a location on a content item displayed on the display screen. The draw module 208 can, responsive to this touch, place a circle at the location on the display screen where the touch occurred. The circle has a color that corresponds to a selected colored ink. In this example, if the user drags his or her finger across the display screen while maintaining contact with the display screen, the draw module 208 can continue to place circles on the content item displayed on the display screen at each position or consecutive positions where a touch is detected. By continuously drawing circles in a continuous path based on the path of the user dragging his or her finger, the end result, in such embodiments, is a continuous line drawn on the content item/display screen that follows the path of the user's touch. In certain embodiments, if a user is using a multi-colored marker that generates a plurality of colors, the color output by the multi-colored marker may change based on a length of a continuous line being drawn by the user. For example, the color output by the multi-colored marker may transition from a first color to a second color once the length of the line being drawn by the user exceeds a threshold length. Similarly, the color output by the multi-colored marker can transition from the second color to a third color if the user continues to draw a continuous line and the line exceeds a second threshold length, and so forth. In various embodiments, the threshold length and the second threshold length can be the same length or different lengths. For example, in some embodiments, the color output by the multi-colored marker may change every y centimeters, or every x pixels, etc.

In some embodiments, a diameter of circles drawn on the display screen can vary based on selection of a marker thickness or width. For example, selection of a thicker (or wider) marker thickness results in placing circles having a larger diameter, while selection of a thinner marker thickness results in placing circles having a smaller diameter. Many variations are possible.

Figure 3:
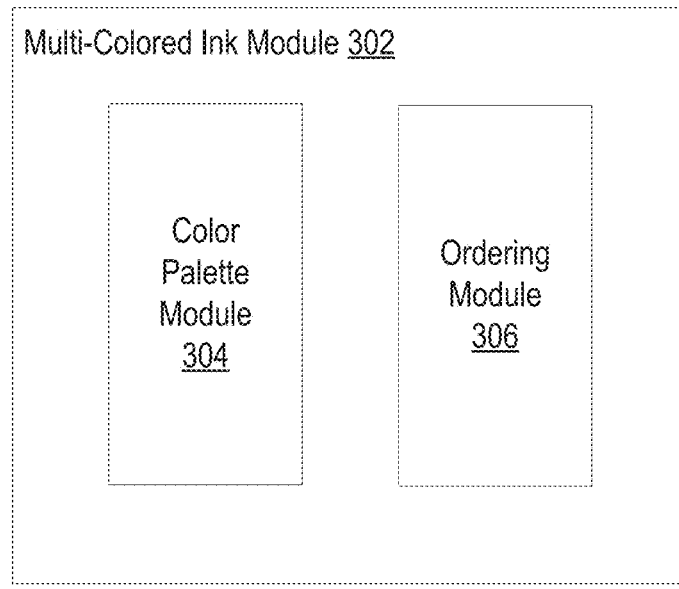
FIG. 3 illustrates a multi-colored ink module, according to an embodiment of the present disclosure.

FIG. 3 illustrates a multi-colored ink module 302, according to an embodiment of the present disclosure. In some embodiments, the multi-colored ink module 206 of FIG. 2 can be implemented as the multi-colored ink module 302. As shown in the example of FIG. 3, the multi-colored ink module 302 can include a color palette module 304 and an ordering module 306.

As discussed, the multi-colored ink module 302 can be configured to generate multi-colored ink on a user interface. In various embodiments, access to multi-colored ink can be provided through a pane of an interface from the selection module 204 of FIG. 2, for example. A user operating a computing device can interact with the pane to select a multi-colored ink to draw on a content item. In some embodiments, a multi-colored ink can be drawn onto a content item by providing circles (e.g., ink dots) of varying colors (e.g., based on a color combination) to the draw module 208 of FIG. 2 to be placed on a content item responsive to a user touch. In certain embodiments, the color combination can be pre-determined based on colors in a pre-defined color palette. For example, a pre-defined color palette may include the colors of a rainbow. Based on this pre-defined color palette, the color palette module 304 can produce a red dot, followed by an orange dot, followed by a yellow dot, followed by green, blue, indigo, and violet ink dots, and so forth. These colored ink dots can then be provided to the draw module 208 of FIG. 2 to be placed onto the content item. Further, in various embodiments, the multi-colored ink is not limited to colors specifically included in a color palette, and additional colors can be used. For example, if a color palette includes a first color followed by a second color, the color palette module 304 can obtain or produce another color that is equal parts the first color and equal parts the second color (e.g., an in-between color). For example, when producing a rainbow ink, the color palette module 304 can produce a colored ink dot that has a color that is equal parts red and equal parts orange. A circle of this resulting color can be provided to the draw module 208 of FIG. 2 after a red ink dot, but before an orange ink dot. In this way, the color palette module 304 can cause a gradual transition between colors in a color palette. In general, the more in-between colors there are, the smoother the color transition will be. In some embodiments, colors in a color palette can repeat once a color corresponding to a last color in the color palette has been provided. For example, in the case of the rainbow ink, once a violet ink dot (e.g. the last color in the rainbow ink) is provided, the color palette module 306 can produce another red ink dot, followed by another yellow ink dot, and so forth. Many variations are possible.

In various embodiments, the ordering module 306 can be configured to maintain ordering of placed (or inserted) colored ink dots. In various embodiments, ordering of colored ink dots may be determined based on an ordering specified in a color palette. For example, if a color palette defines a rainbow ink, the color palette can define an order such that the multi-colored rainbow ink will transition from red, to orange, to yellow, green, blue, indigo, and violate, in that order. In some embodiments, the ordering module 306 can work in concert with the color palette module 304 to ensure a smooth color transition or gradient. For example, in the example of the rainbow ink, the ordering module 306 can ensure that a red ink dot is provided to the draw module 208 of FIG. 2 before an orange ink dot, an orange ink dot is provided before a yellow ink dot, a yellow ink dot is provided before a green ink dot, and so forth. In general, to give an appearance of a gradual and diffused color transition, the placed colored ink dots can be superimposed such that a subsequent colored ink dot is placed on top of a previous colored ink dot with an offset. For example, if a first colored ink dot has been provided to the draw module 208 of FIG. 2 to be placed into a content item, a second colored ink dot can be placed on top of (or superimposed on) the first colored ink dot with an offset, and then a third colored ink dot can be placed on top of (or superimposed on) the second colored ink dot with another offset, and so forth. In various embodiments, the offset can be the same length or different length. For example, in some embodiments, the placement of colored ink dots may be offset by every y millimeters, or every x pixels, etc.

Figure 4A:
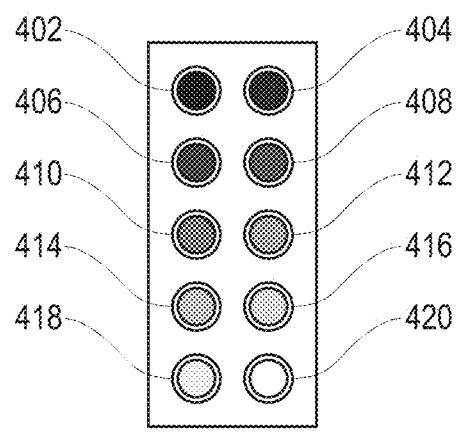
FIG. 4A illustrates an example color palette, according to an embodiment of the present disclosure.
Figure 4B:
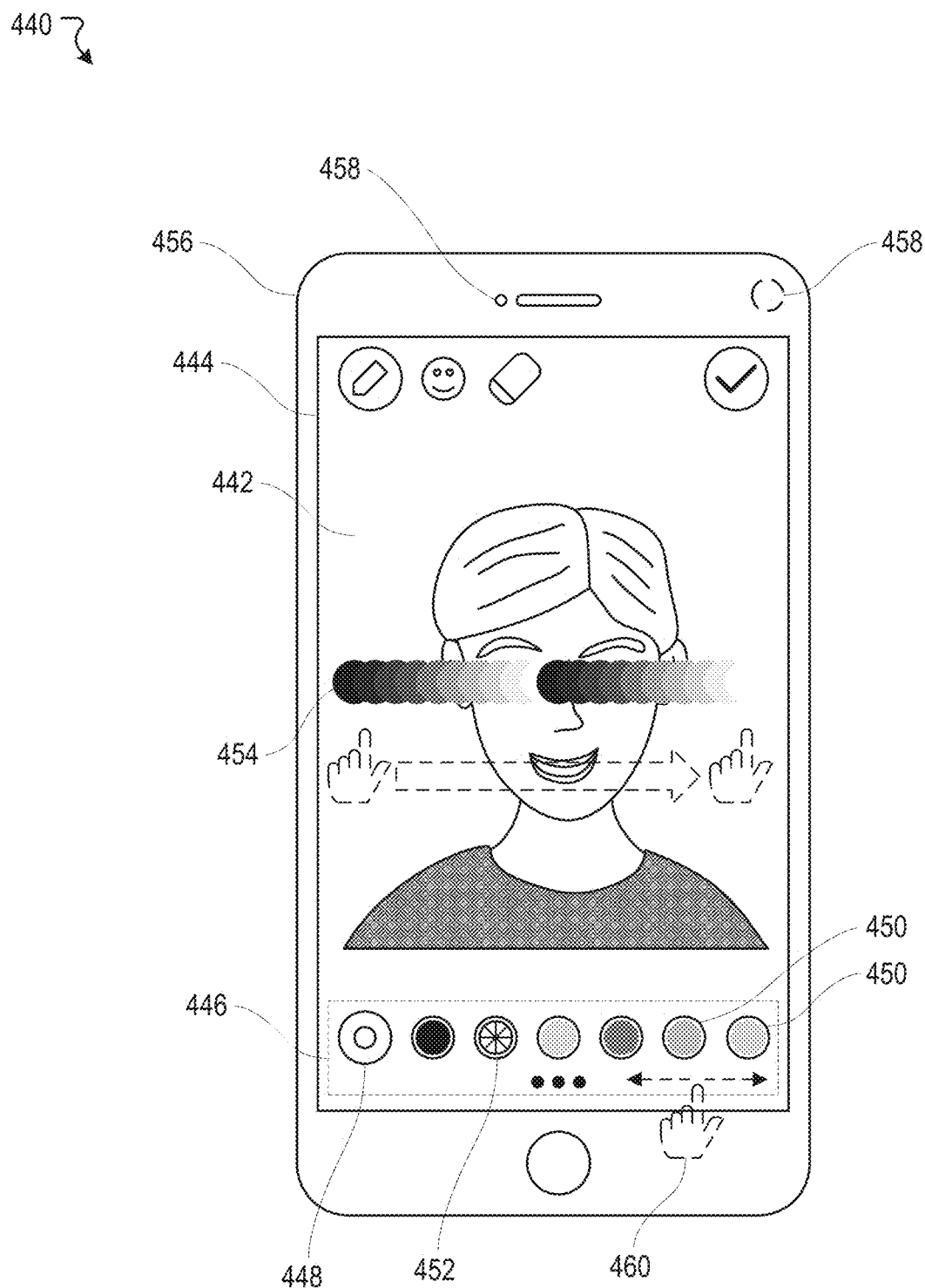
FIG. 4B illustrates an example interface, according to an embodiment of the present disclosure.

FIG. 4A illustrates an example color palette 400, according to an embodiment of the present disclosure. The example color palette 400 is a gray scale palette. In this example, the example color palette 400 consists of ten colors (or shades of a color) ranging from a black color 402 on one end to a white color 420 on other end. In various embodiments, there can be many variations of color palettes. For example, the color palette can be a red-green-blue (RGB) color palette consisting of many color variations of red, green, and blue. A rainbow color scheme (e.g., red, orange, yellow, green, blue, indigo, and violet) can be derived from the RGB color palette, for example. In another example, the color palette can be a cyan-magenta-yellow (CMYK) color palette consisting of many color variations of cyan, magenta, and yellow. Many variations are possible.

FIG. 4B illustrates an example interface 440, according to an embodiment of the present disclosure. The example interface 440 illustrates operation of the content augmentation module 102. In the example of FIG. 4B, a user has identified a content item 442 to be published through a social networking system. The content item can be identified on an interface 444 presented on a display screen of a computing device 456. The interface 444 may be provided through an application (e.g. a web browser, a social networking application, etc.) running on the computing device. In general, the content item 442 may correspond to an existing content item that is stored on the computing device 456 or a content item that was captured using one or more cameras 458 associated with the computing device 456. In some embodiments, the interface 444 may include a region 446, in which various marker characteristics can be presented. The marker characteristics can include an option for adjusting marker width 448 and one or more ink colors 450. In some embodiments, the region 446 can also include an option for a multi-colored ink 452, such as a rainbow ink. The multi-colored ink 452 can be associated with a color palette, such as the color palette 400 of FIG. 4A. The color palette can, in various embodiments, define a set of colors and an ordering of the colors to be output by a marker. In some embodiments, the user can use a swipe gesture 460 on the region 446 to access more color selections. For example, the user can swipe right on the region 446 to access more color selections.

In this example, the user has selected a marker of a particular width with the multi-colored ink 452 to draw on the content item 442. As illustrated in this example, the user can drag his or her finger across the display screen to draw a line 454 with the multi-colored ink 452. The line 454 can comprise a series of colored circles (or colored ink dots) that vary in color. In some embodiments, the variation in color can correspond to colors included in the color palette 400 of FIG. 4A. For example, the line 454 can comprise colors 402 through 420 as defined in the color palette 400 of FIG. 4A. In some embodiments, the multi-colored ink 452 can vary its color based on a RGB color palette, as in the case with the rainbow ink. In some embodiments, the multi-colored ink 452 can vary its color based on a CMYK color palette. Many variations are possible. In various embodiments, colors in a color palette can repeat once a colored color corresponding to a last color in the color palette has been provided. For example, as shown in this example, colors in the line 454 repeat once a colored circle corresponding to a last color of the color palette (i.e., a white colored circle) has been provided.

FIG. 5 illustrates an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can provide a plurality of colored inks for a marker to modify a content item displayed on display screen of a computing system. At block 504, the example method 500 can determine that a user has selected a colored ink from the plurality of colored inks, wherein the plurality of colored inks includes a multi-colored ink. At block 506, the example method 500 can draw one or more lines on the display screen based on a user input and the selected colored ink.

It is contemplated that there can be many other uses, applications, features, possibilities, and/or variations associated with the various embodiments of the present disclosure. For example, in some instances, the disclosed technology can provide the one or more multi-colored ink based on favorite color of users using machine learning techniques. The disclosed technology can also suggest multi-colored ink based on seasons or holidays. The disclosed technology can, for instance, create a custom multi-colored ink consisting of red, white, and blue in celebration of United States Independence Day. In another example, various embodiments of the present disclosure can learn, improve, and/or be refined over time.

Social Networking System—Example Implementation

Figure 6:
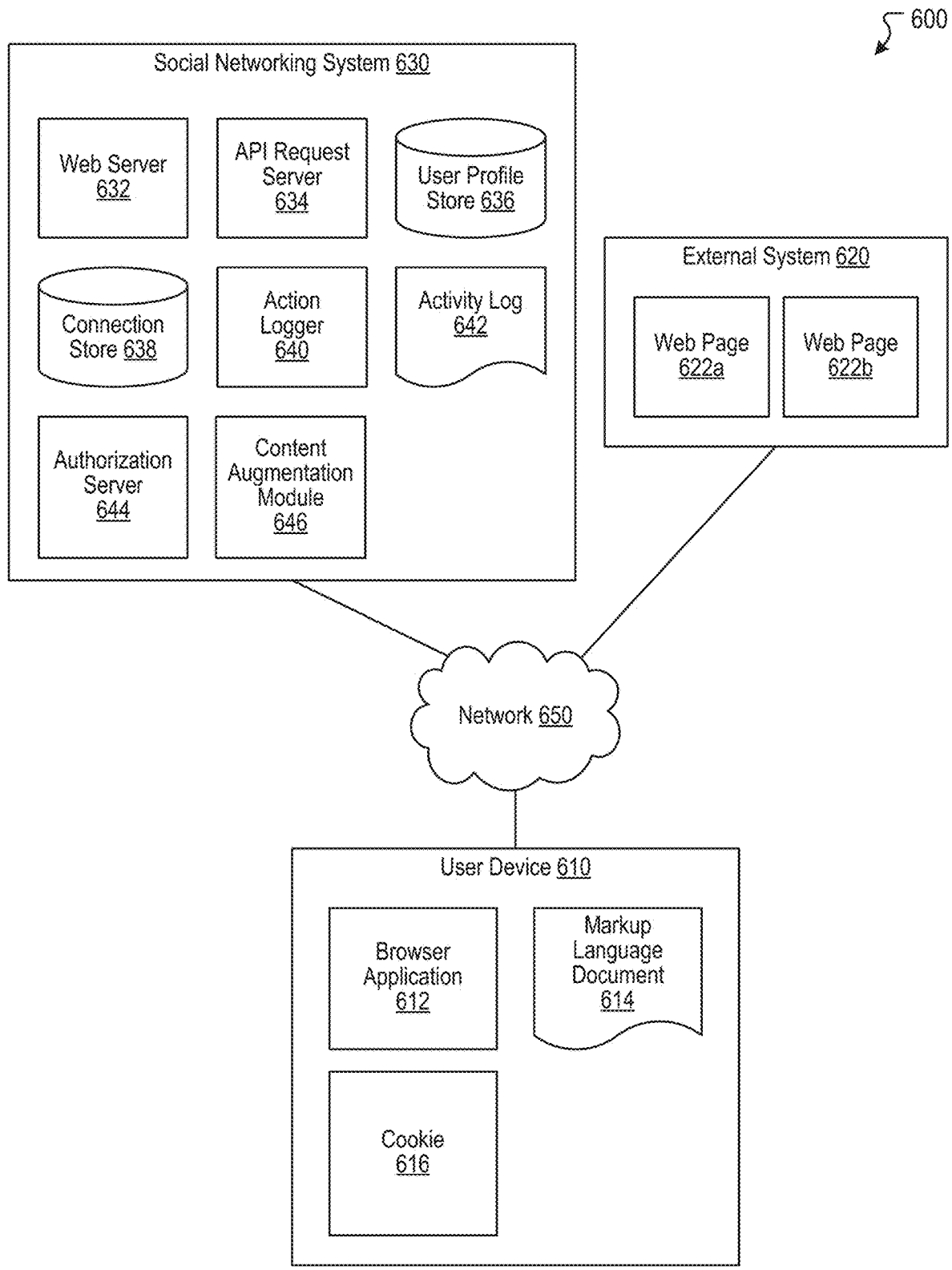
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content augmentation module 646. The content augmentation module 646 can, for example, be implemented as the content augmentation module 102, as discussed in more detail herein. As discussed previously, it should be appreciated that there can be many variations or other possibilities. For example, in some embodiments, one or more functionalities of the content augmentation module 646 can be implemented in the user device 610. As discussed previously, it should be appreciated that there can be many variations or other possibilities.

Hardware Implementation

Figure 7:
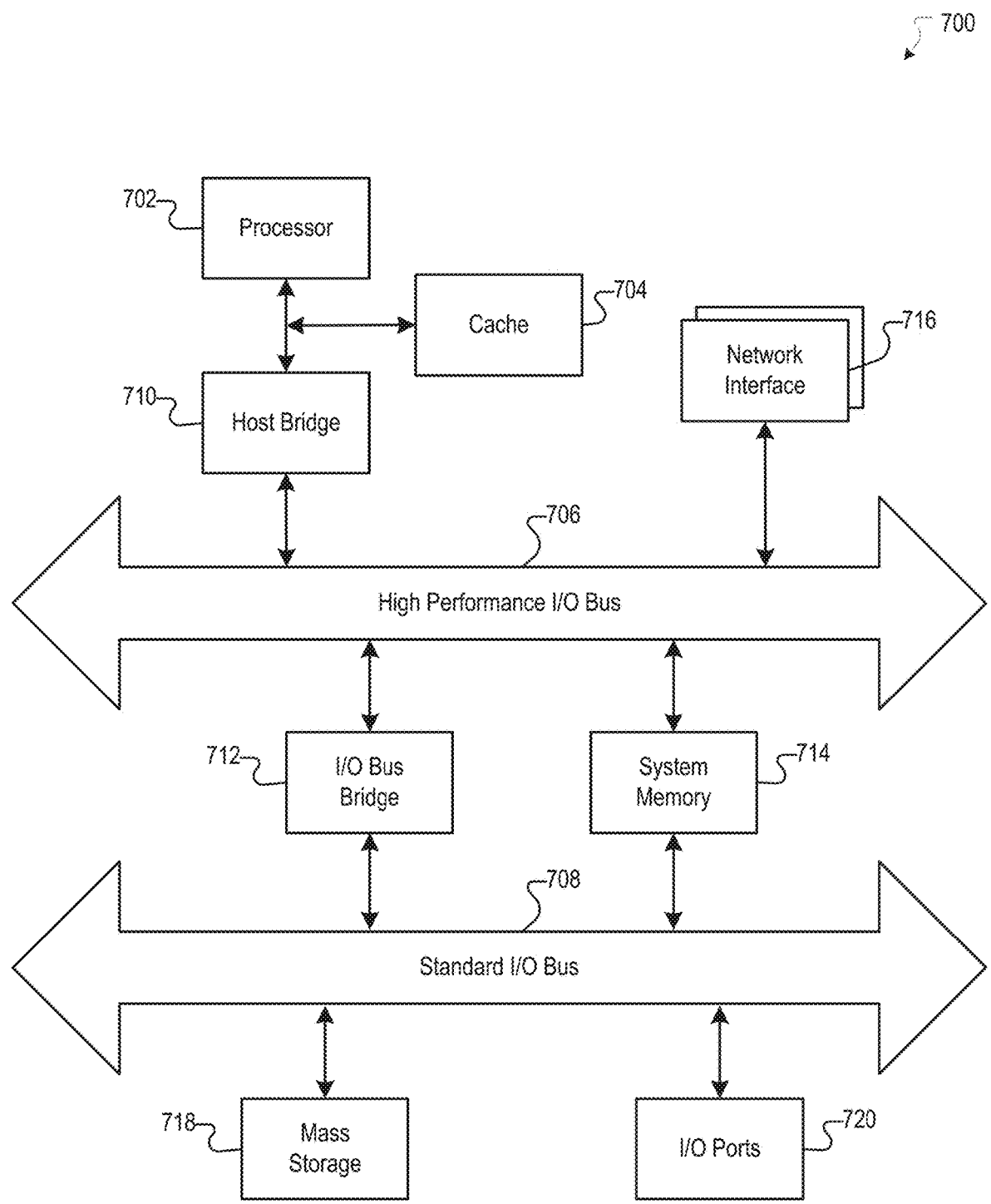
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, a content item selected by a user;
    providing, by the computing system, a plurality of colored inks for a marker to augment the content item, wherein the plurality of colored inks include a multi-colored ink;
    drawing, by the computing system, a continuous line on the content item based on a path of a finger of the user using the marker with the plurality of colored inks to generate an augmented content item,
        wherein the drawing the continuous line comprises drawing a plurality of colored circles defining the continuous line, the plurality of colored circles being superimposed such that a subsequent colored circle is placed on top of a previous colored circle with a predefined offset in pixels or units of length,
        wherein color output of the marker transitions from a first color to a second color of the plurality of colored inks once a first portion of the continuous line exceeds a first threshold length in pixels or units of length, and
        wherein the color output of the marker transitions from the second color to a third color of the plurality of colored inks once a second portion of the continuous line exceeds a second threshold length in pixels or units of length; and
    sharing, by the computing system, the augmented content item through a system.

2. The computer-implemented method of claim 1, wherein the multi-colored ink is associated with a color palette, the color palette comprising a plurality of colors.

3. The computer-implemented method of claim 2, wherein the color palette is associated with an order for the plurality of colors.

4. The computer-implemented method of claim 3, wherein
    user input is associated with a continuous path; and
    the multi-colored ink transitions between the plurality of colors based on a length of the continuous path.

5. The computer-implemented method of claim 2, wherein the plurality of colored circles are superimposed in a fixed color sequence based on the color palette.

6. The computer-implemented method of claim 2, wherein the color palette comprises the colors red, orange, yellow, green, blue, indigo, and violet.

7. The computer-implemented method of claim 1, further comprising:
    providing an option for a selection of a thickness for the marker.

8. The computer-implemented method of claim 7, wherein
    the selection of the thickness for the marker is associated with a diameter of the plurality of colored circles.

9. A system comprising:
    at least one processor; and
    a memory storing instructions that, when executed by the at least one process, cause the system to perform a method comprising:
        obtaining a content item selected by a user;
        providing a plurality of colored inks for a marker to augment the content item, wherein the plurality of colored inks include a multi-colored ink;
        drawing a continuous line on the content item based on a path of a finger of the user using the marker with the plurality of colored inks to generate an augmented content item,
            wherein the drawing the continuous line comprises drawing a plurality of colored circles defining the continuous line, the plurality of colored circles being superimposed such that a subsequent colored circle is placed on top of a previous colored circle with a predefined offset in pixels or units of length, wherein color output of the marker transitions from a first color to a second color of the plurality of colored inks once a first portion of the continuous line exceeds a first threshold length in pixels or units of length, and wherein the color output of the marker transitions from the second color to a third color of the plurality of colored inks once a second portion of the continuous line exceeds a second threshold length in pixels or units of length; and sharing the augmented content item through a system.

10. The system of claim 9, wherein the multi-colored ink is associated with by a color palette, the color palette comprising a plurality of colors.

11. The system of claim 10, wherein the color palette is associated with an order for the plurality of colors.

12. The system of claim 11, wherein
user input is associated with a continuous path; and
the multi-colored ink transitions between the plurality of colors based on a length of the continuous path.

13. A non-transitory computer-readable storage medium including instructions that, when executed by at least one processor of a computing system, cause the computing system to perform a method comprising:
obtaining a content item selected by a user;
providing a plurality of colored inks for a marker to augment the content item, wherein the plurality of colored inks include a multi-colored ink;
drawing a continuous line on the content item based on a path of a finger of the user using the marker with the plurality of colored inks to generate an augmented content item,
wherein the drawing the continuous line comprises drawing a plurality of colored circles defining the continuous line, the plurality of colored circles being superimposed such that a subsequent colored circle is placed on top of a previous colored circle with a predefined offset in pixels or units of length, wherein color output of the marker transitions from a first color to a second color of the plurality of colored inks once a first portion of the continuous line exceeds a first threshold length in pixels or units of length, and wherein the color output of the marker transitions from the second color to a third color of the plurality of colored inks once a second portion of the continuous line exceeds a second threshold length in pixels or units of length; and sharing the augmented content item through a system.

14. The non-transitory computer-readable storage medium of claim 13, wherein the multi-colored ink is associated with by a color palette, the color palette comprising a plurality of colors.

15. The non-transitory computer-readable storage medium of claim 14, wherein the color palette is associated with an order for the plurality of colors.

16. The non-transitory computer-readable storage medium of claim 15, wherein
user input is associated with a continuous path; and
the multi-colored ink transitions between the plurality of colors based on a length of the continuous path.

17. The system of claim 9, further comprising:
providing an option for a selection of a thickness for the marker.

18. The system of claim 17, wherein the selection of the thickness for the marker is associated with a diameter of the plurality of colored circles.

19. The non-transitory computer-readable storage medium of claim 13, further comprising:
providing an option for a selection of a thickness for the marker.

20. The non-transitory computer-readable storage medium of claim 19, wherein the selection of the thickness for the marker is associated with a diameter of the plurality of colored circles.

* * * * *